United States Patent [19]

Michel et al.

[11] 4,131,569

[45] Dec. 26, 1978

[54] OXIDIC CATALYST FOR THE CONVERSION OF WATER GAS

[75] Inventors: Alfred Michel; Hans-Joachim Henkel; Christian Koch, all of Erlangen; Hana Kostka, Grossgründlach, all of Germany

[73] Assignee: Siemens Aktiengesellschaft, Munich, Germany

[21] Appl. No.: 836,222

[22] Filed: Sep. 23, 1977

[30] Foreign Application Priority Data

Sep. 29, 1976 [DE] Fed. Rep. of Germany ....... 2643916

[51] Int. Cl.² ..................... B01J 23/10; B01J 23/76; B01J 21/04
[52] U.S. Cl. ..................................... 252/462; 423/656
[58] Field of Search ...................... 252/462; 423/656

[56] References Cited

U.S. PATENT DOCUMENTS

| 1,330,772 | 2/1920 | Bosch et al. | 423/656 |
| 3,957,962 | 5/1976 | Ramsbotham | 423/656 X |

Primary Examiner—W. J. Shine
Attorney, Agent, or Firm—Kenyon & Kenyon, Reilly, Carr & Chapin

[57] ABSTRACT

An oxidic catalyst for the conversion of water gas which consists of oxides of the metals aluminum, lanthanum, cobalt, nickel and uranium, with the aluminum oxide being present predominantly as $\alpha$-$Al_2O_3$. The lanthanum and cobalt content is 5 to 30% by weight, that of nickel, 0.1 to 4% by weight and of uranium, 0.1 to 2% by weight, related to the total weight of the catalyst.

8 Claims, No Drawings

OXIDIC CATALYST FOR THE CONVERSION OF WATER GAS

BACKGROUND OF THE INVENTION

The invention relates to an oxidic catalyst for the conversion of water gas.

The most important and most frequently used method to produce hydrogen, for instance, for the synthesis of ammonia, is probably the conversion of water gas. Water gas, which is obtained, for instance, through gasification of coal and consists of carbon monoxide and water, is converted in accordance with the reaction (so called "conversion")

$$CO + H_2O \rightleftarrows H_2 + CO_2,$$

where the carbon dioxide produced can easily be washed out from the hydrogen containing gas mixture under pressure with water.

Since the conversion proceeds exothermally with a heat exchange of about 10 kcal/mol, the equilibrium must be adjusted at a temperature as low as possible, which requires the use of catalysts. In practice, the conversion is usually carried out in several stages, with a rough conversion followed by scrubbing of the $CO_2$ being performed first in high temperature stages (400 to 600° C) and then a quantitative conversion in low temperature stages (200 to 400° C).

In large scale processes shaped bodies of zinc oxide and copper oxide are usually used as catalysts for the conversion. Iron oxide and chromium oxide catalysts and other combinations of these four oxides are also known. However, the stability of these catalysts, particularly the mechanical stability at high temperatures, is not too good. Although it is known in catalysts for other reactions that the stability can be increased if the catalytically active metal components are applied to a carrier material containing aluminum oxide, catalysts containing aluminum oxide are not being used at present for water gas conversion. The reason for this would seem to be that the active metal components used so far are largely blocked by the presence of aluminum oxide. In "Chemical Abstracts", vol. 80, 1974, 125 328 w, an iron oxide/chromium oxide catalyst for water gas conversion at 300 to 425° C is described which contains 0 to 8% aluminum oxide. It is mentioned that an $Al_2O_3$ content of 2% increases the thermal stability but it is noted at the same time that the activity decreases with increasing aluminum oxide content.

SUMMARY OF THE INVENTION

It is an object of the present invention to make available a new catalyst for the conversion of water gas which has at the same time high mechanical stability and high catalytic activity.

This problem is solved by a catalyst which consists of oxides of the metals aluminum, lanthanum, cobalt, nickel and uranium, aluminum being present predominantly as $\alpha$-$Al_2O_3$ and wherein the lanthanum and cobalt content is 5 to 30% by weight, that of nickel 0.1 to 4% by weight and of uranium, 0.1 to 2% by weight, always related to the total weight of the catalyst.

The atom ratio of lanthanum to cobalt is advantageously between 1:4 and 4:1, preferably about 1:1. In one preferred embodiment of the catalyst according to the present invention, the lanthanum and cobalt content of the catalyst is between 8 and 20% by weight, related to the total weight of the catalyst.

The nickel content of the catalyst is advantageously between 0.25 and 2% by weight, and preferably between 0.3 and 1% by weight. The uranium content, furthermore, is preferably between 0.1 and 1.0% weight.

The catalyst according to the present invention can be produced by making a shaped body from aluminum oxide hydrate by pressing and calcining at temperatures above 1000° C, by impregnating the shaped body with a solution of thermally decomposable compounds of the metals lanthanum, cobalt, nickel and uranium and by subsequently subjecting the impregnated shaped body to a heat treatment for decomposing the metal compounds.

Boehmite, gibbsite and also bayerite, for instance, can be used as aluminum oxide hydrates in this connection. Since the shaped body is annealed at temperatures above 1000° C and among all the modifications of aluminum oxide only the $\alpha$-modification is stable at these temperatures, the type of the aluminum oxide hydrate used is not essential. With annealing times of 4 hours, the aluminum oxide hydrates are converted so completely into $\alpha$-$Al_2O_3$ that other modifications of $Al_2O_3$ are not detectable by X-ray radiography, i.e., it can be no more than 10%. The calcining operation is preferably continued for more than 6 hours, whereby a mechanically stable shaped body is produced.

For impregnating, aqueous solutions of metal nitrates can be used, and the subsequent heat treatment can consist of annealing in air at 400 to 650° C. At these temperatures, decomposition of the metal nitrates is assured. However, other soluble metal compounds, e.g., chlorides and/or sulfates can also be used for impregnating. The temperatures suitable for the heat treatment depend in general on the type of metal compounds used.

However, the catalyst according to the present invention an also be produced by making a shaped body from aluminum oxide hydrate and thermally decomposable compounds of the metals lanthanum, cobalt, nickel and uranium by pressing and subsequently calcining the shaped body at temperatures above 1000° C. Here, the metal compounds are already decomposed during the calcining.

The shaped body can thus be produced, for instance, by mixing the aluminum oxide hydrate with the metal compounds and subsequently pressing them to form the shaped body. The metal compounds need not be present in solution, i.e., insoluble compounds can also be used. However, the aluminum oxide hydrate can also be pressed into a shaped body first and the latter can subsequently be impregnated with a solution of the metal compounds. With this manufacturing process, the shaped body containing the metal compounds must be heated slowly in the annealing process to the annealing temperature (above 1000° C), so that the gas development, which is caused by the decomposition of the metal compounds that occurs, does not lead to the partial destruction of the shaped body. This disadvantage, however, is compensated for in some cases if the transformation of the aluminum oxide hydrates to $\alpha$-$Al_2O_3$ and the thermal decomposition take place simultaneously, which saves one process step.

Due to the high aluminum oxide content, the catalyst according to the present invention exhibits, in particular, great mechanical stability. At the same time, however, the catalytic activity of the catalyst is improved over the activity of customary conversion catalysts, which carries weight particularly in large scale processes.

DETAILED DESCRIPTION OF THE INVENTION

The invention will now be explained in further detail with reference to two examples and a test.

EXAMPLE 1

A honeycomb body is formed in the conventional manner of boehmite by pressing under a pressure of 28 $MN/m^2$ and is subsequently converted into $\alpha$-$Al_2O_3$ by annealing in air at 1520° C for 8 hours. The open porosity of the calcined carrier (determined in accordance with DIN 51056) is about 79% by volume.

200 ml of impregnating solution are prepared from 373 g $La(NO_3)_3.6\ H_2O$, 252 g $Co(NO_3)_2.6\ H_2O$, 33 g $Ni(NO_3)_2.6\ H_2O$ and 8 g $UO_2(NO_3)_2.6\ H_2O$ as well as distilled water. 1000 g of the carrier material are impregnated twice with this solution, the honeycomb body being dried at 150° C between the two impregnating operations. Subsequenty, the impregnated shaped body is dried for 12 hours in air at 120° C and heated to 620° C in 2.5 hours. Subsequently, the shaped body is heat treated for 3.5 hours in air at temperatures between 620 and 656° C, whereby the metal nitrates are decomposed and oxides are formed.

The finished catalyst contains about 12.0% by weight lanthaanum, 5.1% by weight cobalt, 0.7 by weight Ni and 0.4% by weight U, calculated as the weight of the metals relative to the total weight of the catalyst.

EXAMPLE 2

Extrusions are formed from gibbsite at a pressure of 40 $MN/m^2$, which are annealed for 4 to 10 hours at 1050° C. The diameter of the extrusions (shaped bodies) is 6 mm and the length 7 to 12 mm. X-ray radiographic examination of the annealed aluminum oxide, with a sensitivity of 10%, shows only the $\alpha$-modification.

From 854.4 g $La(NO_3)_3.6\ H_2O$, 567.7 g $Co(NO_3)_2.6\ H_2O$, 71.9 g $Ni(NO_3)_2.6\ H_2O$ and 13.4 g $UO_2(NO_3)_2.6\ H_2O$, a mixture is prepared which is dissolved in so much distilled water that 1200 ml of solution, measured at 20° C, is obtained.

1000 g of the annealed shaped bodies are once impregnated for 1 hour in the impregnating solution. The excess impregnating solution is decanted, the moist catalyst is dried at 120° C in air and subsequently annealed for 8 hours at 600° C.

The catalytic effectiveness of the catalyst according to Example 2 (Catalyst A) for the reaction

$CO + H_2O$ (steam) $\rightleftarrows CO_2 + H_2$ was tested in a test setup in the laboratory. The reaction was carried out with excess $H_2O$, which is in accordance with technical practice, where water excess of one to eleven times is encountered. This shifts the reaction equilibrium to the right side and improves the conversion of the carbon monoxide.

For comparison, a commercially available catalyst (B) was used which is intended for large-scale technical use and, according to the results of a spectral analysis, contained the following metal additions, besides iron oxide: 0.04% Al, 11% Cr, 0.09% Cu, 0.03% Mg, 0.2% Mn, 0.05% Na, 0.14% Si and 0.14% Si and 0.14% Zn.

The results of the test are listed in the following Table. In this test, the water was evaporated, mixed with the carbon monoxide and the mixture was preheated to about 300° C. The reactor was heated from the outside, the (maximum) reaction temperature given in the Table being kept nearly constant. In the case of the last two columns of the Table, the temperature at the catalyst varied only between 561 and 566° C. The quantity data for the raw materials refer to the use per liter of catalyst volume and hour and are given as normalized volumes, i.e., for water at 20° C and atmospheric pressure, and for CO at 0° C and atmospheric pressure. The composition of the reaction products refers to the gas mixture obtained, after the excess steam was condensed out and drained off.

Accordngly as shown by the Table carbon monoxide is converted with the catalyst according to the invention at least to the same extent as with the reference catalyst, but the formation of hydrogen is improved, while the formation of byproducts, particularly of the hydrocarbons, is largely suppressed. This is true at least in the region of high temperature conversion, i.e., at 400 to 600° C.

Similar tests with the catalyst according to Example 1 showed substantially the same results.

Table

| Starting materials: | | A | B | A | B |
|---|---|---|---|---|---|
| $H_2O$ | (l/l·h) | 4.0 | 4.3 | 8.06 | 8.06 |
| CO | (Nl/l·h) | 2500 | 2500 | 2500 | 2500 |
| Reaction temperature | (° C) | 556 | 556 | 566 | 566 |
| Composition of the reaction products (% by volume): | | | | | |
| $CO_2$ | | 43.6 | 40.2 | 45.0 | 42.1 |
| $H_2$ | | 38.1 | 34.0 | 38.5 | 34.9 |
| $CH_4$ | | 1.0 | — | — | — |
| CO | | 17.3 | 21.0 | 16.5 | 16.5 |
| $C_2H_4 + C_2H_6$ | | — | 4.6 | — | 6.2 |

What is claimed is:

1. An oxidic catalyst for the conversion of water gas consisting of oxides of the metals aluminum, lanthanum, cobalt, nickel and uranium, the aluminum oxide being present predominantly as $\alpha$-$Al_2O_3$, said aluminum oxide acting as a carrier for the oxides of the metals lanthanum, cobalt, nickel and uranium, and with a lanthanum and cobalt content of 5 to 30% by weight, a nickel content of 0.1 to 4% by weight, and a uranium content of 0.1 to 2% by weight, always related to the total weight of the catalyst.

2. The catalyst according to claim 1 wherein lanthanum and cobalt are in an atom ratio of between 1:4 and 4:1.

3. The catalyst according to claim 2 wherein said atom ratio is 1:1.

4. The catalyst according to claim 1 wherein said lanthanum and cobalt content is 8 to 20% by weight.

5. The catalyst according to claim 1 wherein said nickel content is 0.25 to 2% by weight.

6. The catalyst according to claim 1 wherein said uranium content is 0.1 to 1% by weight.

7. A method for the manufacture of a catalyst for the conversion of water gas comprising:
   a) making a shaped body from aluminum oxide hydrate by pressing and calcining at temperatures about 1000° C;
   b) impregnating the shaped body with a solution of thermally decomposable compounds of the metal lanthanum, cobalt, nickel and uranium; and c) subsequently heat treating the impregnated shaped body to a temperature sufficient to decompose the metal compounds to metal oxides.

8. A method for the manufacture of a catalyst for the conversion of water gas comprising:
a) making a shaped body from aluminum oxide hydrate and thermally decomposable compounds of the metals lanthanum, cobalt, nickel and uranium by pressing; and
b) subsequently calcining the shaped body at temperatures above 1000° C.

* * * * *